US005140213A

United States Patent [19]

Nettelhoff et al.

[11] Patent Number: 5,140,213

[45] Date of Patent: Aug. 18, 1992

[54] COLLECTOR FOR A DYNAMO ELECTRIC MACHINE

[75] Inventors: Friedrich W. Nettelhoff, Menden; Theo Bremkes, Fröndenberg, both of Fed. Rep. of Germany

[73] Assignee: Friedrich Nettelhoff Kommanditgesellschaft Spezialfabrik fur Kleinkollektoren, Schwitten, Fed. Rep. of Germany

[21] Appl. No.: 699,088

[22] Filed: May 13, 1991

[30] Foreign Application Priority Data

May 16, 1990 [DE] Fed. Rep. of Germany ....... 4015705

[51] Int. Cl.$^5$ .............................................. H02K 13/00

[52] U.S. Cl. .................................... 310/219; 310/235; 310/236

[58] Field of Search ............... 310/219, 232, 233, 234, 310/235, 236, 237, 43, 91; 29/297

[56] References Cited

U.S. PATENT DOCUMENTS

| | | | |
|---|---|---|---|
| 1,816,629 | 7/1931 | Wörner | 310/219 |
| 2,672,564 | 3/1954 | Krasno | 310/233 |
| 2,997,559 | 8/1961 | Catton | 310/235 |
| 3,657,584 | 4/1972 | Vartanian | 310/232 |
| 3,777,367 | 12/1973 | Kalagidis | 310/234 |
| 4,050,882 | 6/1976 | Letts | 310/235 |

FOREIGN PATENT DOCUMENTS

| | | | |
|---|---|---|---|
| 0674358 | 3/1939 | Fed. Rep. of Germany | 310/235 |
| 0468616 | 7/1937 | United Kingdom | 310/235 |

*Primary Examiner*—R. Skudy

*Attorney, Agent, or Firm*—Jordan and Hamburg

[57] ABSTRACT

A collector for an electric motor or generator with lamellae, which are distributed symmetrically to a collector axis at the periphery or at a front face and which are embedded in a basic body of insulating material, the collector having a central opening, which is designed with respect to its diameter for a press fit on the shaft of the electric motor or generator and is reinforced by a bushing element of higher strength for absorbing the seating and pressing-on forces, is designed in the sense of being easier and less expensive to manufacture, being handled more readily and less critically while being pressed onto the shaft of a motor and being more robust and having a longer service life, so that the busing element has an internal diameter, which is larger than the diameter of the opening, and that the bushing element is covered on the inside by a layer of insulating material.

14 Claims, 1 Drawing Sheet

COLLECTOR FOR A DYNAMO ELECTRIC MACHINE

The invention relates to an collector for a dynamo-electric machine.

BACKGROUND OF THE INVENTION

Particularly as a result of the high and still increasing numbers of electric motors produced and despite their traditional basic structure with a basic body of an insulating material, preferably a duroplastic material, and with metallic lamellae at the periphery (cylindrical collector) or at a front side (plane collector), collectors have underdgone extensive development, affecting various details. This development was intended to take into account the function of the collectors, their simple and reliable installation, their robustness and long service life and, last but not least, low production costs.

A collector is subjected to particularly high stresses during the installation, for which the connection of the winding conductors to the lamellae and, even more so, the pressing of such a collector onto the shaft of a motor are critical. In the past, the latter has led to critical stresses in the case of collectors with a uniform basic body consisting of a duroplastic insulating material. These stresses were dangerous even when they produced only invisible, internal destruction or cracks.

Typically, forces of several thousand Newton are employed to mount a collector on the shaft of an electric motor. For this reason, a sheathing has long been used, so that the seat of the collector towards the shaft is formed by an internal metallic bushing, which is capable of absorbing the much higher expansion forces and frictional forces encountered when mounting a collector on a shaft, than is the insulating material. Because of the high load-carrying capability and stiffness of the metal, such a bushing element is in a position to keep the insulating effectively free of the high shear and tensile stresses that develop as the collector is pressed onto the shaft of the motor. After that, the bushing can keep the tensile stresses emanating permanently from the press fit away from the insulating material.

Such a busing element presupposes, however, a production process, which is capable of complying with close tolerances. Typically, the bushing element, after it has been pressed together with the lamellae with the insulating material to an integral basic body, must be finished, in order to compensate for adjustment errors that arise during the installation and the pressing. Such finishing work on cast metal bushing elements is costly.

Accordingly, there have also already been attempts to embed a spiral spring element, rather than a metallic bushing element, at the inside of the borehole in the basic body of insulating material. Because of its elasticity, this spiral spring element can be put easily and flush on a mandrel in the injection mold for the basic body of insulating material. However, such a spring element is only conditionally adequate to absorb the forces that develop when a collector is pressed and seated onto the shaft of the motor, because it is deformable in the axial direction and because the spreading forces emanating from the press fit can pass through the windings.

SUMMARY OF THE INVENTION

It is an object of the invention to provide a collector with a basic body of insulating material, which is reinforced by a bushing element, is easier to manufacture and therefore less expensive, can be installed easily and is very robust and achieves a long service life.

To provide on the inside of the bushing layer of insulating material, according to the present invention, a is provided on the inside of the bushing which in turn forms the opening with the specified internal diameter, and which is advantageous from several points of view. This solution is derived from the basic concept that the busing element itself forms the opening and directly absorbs all expansion and pressing-on forces, in order to shield the insulating material that is behind the bushing. It turns out here that the inner layer of insulating material with the bushing element "at the back" is quite capable of absorbing the forces, which arise when pressing on the collector and are required for a press fit and to pass on these forces to the bushing element.

If, however, the inner layer of insulating material forms the opening, it can, in many cases be already formed with sufficient precision by the molding process, without requiring any finishing operation. In this connection, it is also of interest that a layer, which is formed from an insulating material, can receive because of its lesser stiffness a greater tolereance than a bushing element from a material of higher strength, such as steel. In many cases, the opening can be achieved with sufficient dimensional accuracy already with the pressing process that puts in place the insulating material.

Even if the opening of the basic body requires finishing, such an operation can be carried out comparatively inexpensively, because the processing of insulating material is faster and easier from the point of view of the tools and work involved, than is the processing of metal or of other materials of high strength.

A further important advantage of the collector designed pursuant to the invention arises during the installation, during which one need no longer fear that pressing the collector onto the shaft of the motor leads to damage to the latter or to the bushing element. The feared "seizing"—the cold welding of surface regions of metal surfaces moved frictionally against one another under high pressure—endangers not only the seat of the collector upon appropriate damage to the bushing element or the shaft, it can also previously cause damage to the projecting end of the motor shaft. This damage then destroys the seat of the roller bearing, which is mounted subsequently. When an insulating material is paired with steel, the risk of such damage is eliminated and the possibility is created for mounting the collector on the motor shaft without problems.

The inner layer of insulating material advisably is constructed to be at least 0.5 mm and preferably 1 to 2 mm thick, in order to make the bushing element independent of tolerances in its arrangement before and while putting the insulating material in place, in order to achieve a sufficient flexibility of the opening for the press fit and also to ensure, if necessary, a sufficient insulation.

The inner layer can namely also assume insulation tasks. These are in demand particularly in those cases a double insulation of all voltage-carrying parts is to be provided according to the appropriate safety regulations. For this purposes, an intermediate layer of insulating material between the bushing element and the shaft can be enlisted, when the busing element consists of metal. It is self-evident that a bushing element in the form of a section of steel pipe is available particularly inexpensively and therefore comes into consideration primarily. With this, other materials of higher strength, such as other metals, fiber composities or ceramics are by no means excluded. The busing element with its internal sheath need also not form a completely closed support surface for the expansion forces emanating from the press fit, as long as it absorbs the forces 2-dimensionally. In principle, this can also be accomplished with a sieve-like or net-like bushing element, which has a sufficiently narrow mesh, is inherently stable and can carry a load.

Subdomains, which the bushing element releases in its cylindrical plane for material bridges between the inner layer of insulating material and the rest of the basic body, are even advantageous in order to secure the bond within the basic body, particularly also with respect to the danger of shearing off long the interfaces of insulating material and bushing element. In the case of a metallic bushing element, such transitional regions can be shifted to advantage to the front faces, in that the bushing element merely has a lesser length than does the basic body of insulating material. It is self-evident that the bond between the bushing element and the adjoining insulating material can be improved at the inner casing surface and/or the outer casing surface by profiling, perhaps by transverse grooves or thread grooves. Likewise, an adhesion promoting layer or a layer of coupling agent can improve the cohesion. All of this arises particularly from those shear stresses, which occur, when a collector is pressed onto the shaft of a motor.

An embodiment of the invention is shown in the drawings and is described in greater detail hereinafter.

DESCRIPTION OF THE PREFERRED EMBODIMENTS

Figure 1:
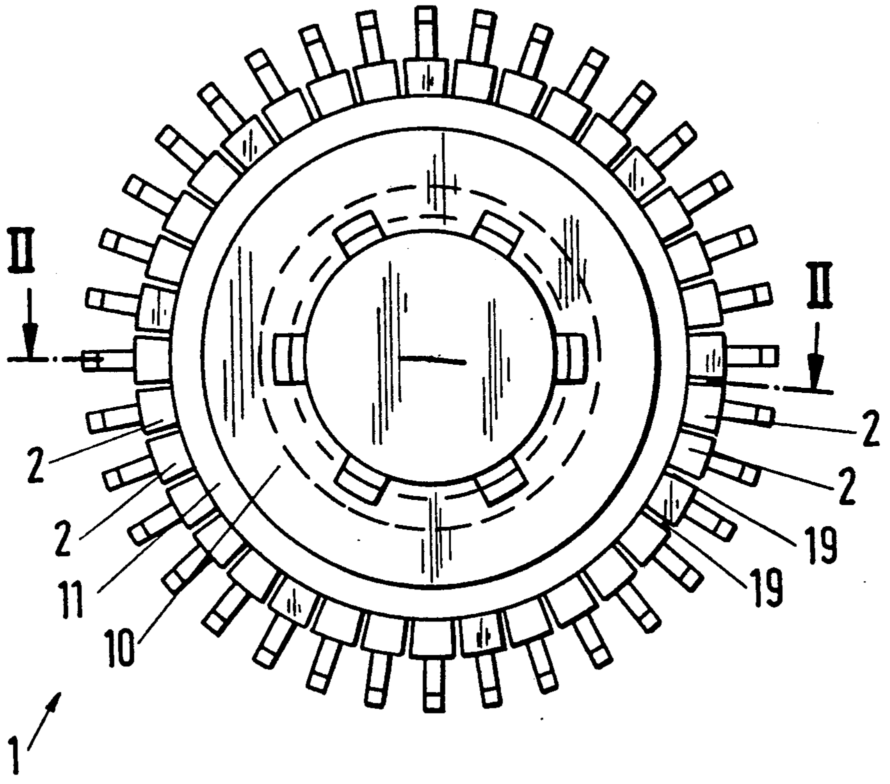
FIG. 1 is a plan view of a collector.
Figure 2:
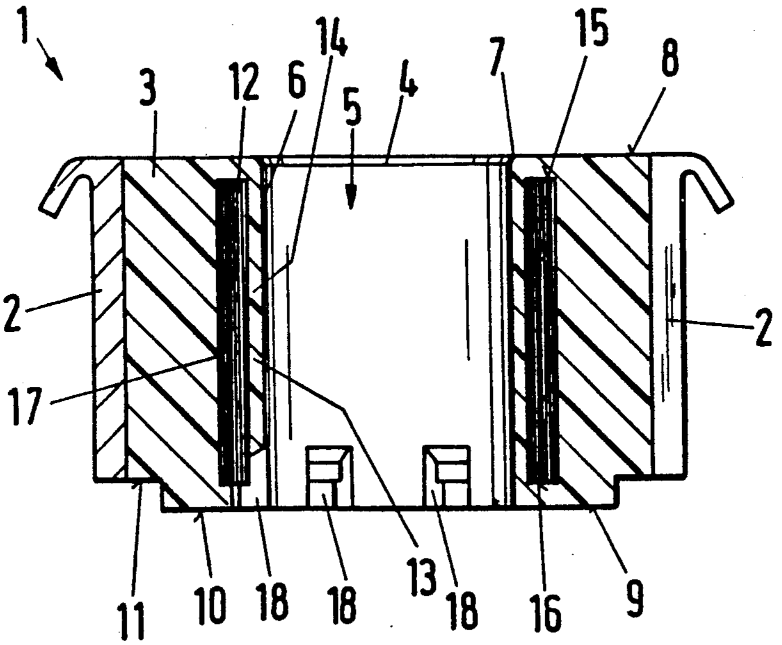
FIG. 2 is a sectional view taken along the line II—II of FIG. 1.

In the drawings the collector as a whole is labelled 1. The collector is in the shape of a cylindrical collector with lamellae 2, which are disposed at the periphery. The lamellae are embedded in a known manner over internal cross members, which are not shown, in an essential cylindrical basic body 3 of an insulating material, namely a duroplastic material. The collector is rotationally symmetrical with respect to an axis 4 and is provided on the inside with a continuous opening 5. On the periphery side, the opening 5 is bounded by an inner wall 5, which is provided for a press fit on the shaft of an electric motor. Over a bevel 7, the inner wall 6 changes into a front face 8, which forms the front side of the collector during a pressing-in motion. The bevel 7 facilitates the slipping on, the aligning and the centering of the collector relative to the shaft of the motor and avoids canting and damage.

A front side 9, which is opposite to front side 8, is formed ladder-shaped in longitudinal section with an internal annular surface 10 and an annular surface. 11, which is recessed relative to annular surface 10. Annular surface 11 finishes flush with the lamellae 2, so that both obtain an air gap to the adjacent metal parts, such as a roller bearing or a hemispherical bearing for the shaft of the electric motor. With that, the danger of contact between electrically contacting metal parts, particularly between the voltage carrying lamellae 2 and the mechanical construction of the motor can be avoided.

A bushing element 12 is embedded in the basic body 3 and, moreover, in such a manner that, with an internal sheath 13, it maintains a distance of about 1 mm from the inner wall 6. This distance is formed by an intermediate layer 14 from the same insulating material as the rest of the basic body 3.

The bushing element also has an axial length, which is less than that of the basic body 3, so that its front sides 15 and 16 respectively do not extend as far as the front sides 8 and 9 of the basic body 3. The insulating material of the basic body bridges and encloses the bushing element at both ends. With that, the intermediate layer 14 is connected integrally with the remainder of the basic body 3. These connections are of particular interest for the cohesion of the collector 1, in the event that the adhesion between the insulating material along the inner sheath 13 and along an outer sheath 17 of the bushing element 12 is not reliably adequate for transferring the shear forces as the collector is being pressed onto the shaft.

Aside from the end bridges between the inner layer 14 and the rest of the basic body, the bushing element 12 encloses the inner wall 6 and supports the layer 14 during the absorption of expansion forces in the pressed-on state.

The bushing element 12 is formed from a material, which has a higher strength and stiffness than does the insulating material and, in the present case, is steel. The intermediate layer is held and stabilized in this manner by pressure all around and the bushing element absorbs the expansion forces resulting from the press fit on the shaft of the motor.

This results in a robust construction of the collector. At the same time, the collector is very easily installed, since, together with the inner layer of insulating material, it can be pushed onto a steel shaft in a very much better and noncritical manner than a collector with an inner metal bushing.

The collector 1 can also be produced relatively simply and inexpensively. The lamellae 2 and the bushing element 12 are disposed in a press mold in the same manner relative to one another as they are to be in the finished collector. Usually, the lamellae are fixed in position relative to one another and in the mold by special holding devices in the nature of a "lost mold". The bushing element could also be fixed in position, for example, by a plastic mold ring. In the present case, however, provisions are made so that the bushing element 12 rests on a crown of 12 claws, which are disposed in circular fashion to one another. The bushing element 12 is centered by these claws with internal contact. The claws leave behind at least three corresponding recesses 18 in the finished collector. The cavity of the collector is kept free by a central mandrel so that, after the remaining cavities are sprayed with a duroplastic material, an unfinished collector results, which differs from the collector shown only owing to the fact that insulating gaps 19 must still be milled out between lamellae 2.

As a rule, the collector can be manufactured by injection molding without requiring any finishing of the inner wall 6. However, should finishing be required, then such work can be carried out rapidly and without problems, since the insulating material is much easier to process than a metal bushing at the inside.

The above example deals with a cylindrical collector with a continuous axial opening. It is readily evident from the context described that a plane collector can have a very similar construction and that collectors with a blind-hole opening discharging on only one side can also be constructed correspondingly.

To fulfill its function, the bushing must be sufficiently strong. In the simplest case, this is achieved with a metal bushing, for which different materials, as well as alloys or sintered metals also come into consideration. However, high-strength plastics or a composite material that is reinforced with fibers can also be used. The bushing can be profiled or have openings, which counteract shearing off. Bushings in lattice or spiral form, as well as multipart bushings of rings can also be used to advantage.

We claim:

1. A collector for a dynamoelectric machine comprising an insulating body having a central passage adapted to receive by a press fit a shaft of a dynamoelectric machine, said central passage having an internal diameter, said insulating body having longitudinal ends, lamella on said insultating body, and strengthening means embedded in said insulating body juxtaposed to said central passage for absorbing seating and press-on forces when said central passage receives said press fit of said shaft, said strengthening means comprising a reinforcing bushing having an internal diameter greater than said internal diameter of said central passage such that said insulating body has a layer portion disposed on the inside of said bushing and which defines said central passage, said bushing having longitudinal ends spaced from said longitudinal ends of said insulating body such that said insulating body has insulating body portions disposed between said longitudinal ends of said bushing and said longitudinal ends of said insulating body.

2. A collector for a dynamoelectric machine according to claim 1, wherein said insulating body has at least three circumferentially spaced recesses.

3. A collector for a dynamoelectric machine according to claim 1, wherein said insulating body has a front longitudinal end, said central passage having a bevel at said front longitudinal end.

4. A collector for a dynamoelectric machine according to claim 1, wherein said layer portion has a thickness of at least 0.5 mm.

5. A collector for a dynamoelectric machine according to claim 1, wherein said collector is a cylindrical collector.

6. A collector for a dynamoelectric machine according to claim 1, wherein said bushing is made of metal.

7. A collector according to claim 1, wherein said layer portion has a thickness of from 0.5 mm to 2 mm.

8. A collector according to claim 1, wherein said layer portion has a thickness of from 1 mm to 2 mm.

9. A collector according to claim 1 further comprising a coupling agent layer between said bushing and said insulating body to improve cohesion between said bushing and said insulating body.

10. A collector according to claim 1 further comprising an adhesion promoting layer between said bushing and said insulating body.

11. A collector according to claim 1, wherein said bushing has an outer cylindrical surface, an entire area of said outer cylindrical surface being in contact with said insulating body.

12. A collector according to claim 1, wherein said insulating body is a molded body which is molded about said bushing such that said bushing is embedded in said molded body.

13. A collector for a dynamoelectric machine comprising an insulating body including an insulating layer having a cylindrical central passage adapted to receive by a press fit a shaft of a dynamoelectric machine, said cylindrical central passage having an internal diameter, said insulating body having an outer cylindrical boundary, said insulating body having longitudinal ends, lamella disposed about said insulating body, and strengthening means embedded in said insulating body at a position substantially closer to said central passage than to said outer cylindrical boundary of said insulating body for absorbing seating and press-on forces when said central passage receives said press fit of said shaft, said strengthening means comprising a reinforcing bushing having an inside with an internal diameter greater than said internal diameter of said central passage such that said insulating layer is disposed on the inside of said bushing and which defines said central passage, said bushing having longitudinal ends spaced from said longitudinal ends of said insulating body such that said insulating body has insulating body portions disposed between said longitudinal ends of said bushing and said longitudinal ends of said insulating body, said insulating body being a molded body which is molded about said bushing such that said bushing is embedded in said molded body.

14. A collector for a dynamoelectric machine according to claim 13, wherein said layer has a thickness which does not exceed 2 mm.

* * * * *